United States Patent

[11] 3,547,018

| [72] | Inventor | Karlheinz Haberle<br>Munderkinger Str. 3, Stuttgart-Wangen, Germany |
| [21] | Appl. No. | 716,122 |
| [22] | Filed | March 26, 1968 |
| [45] | Patented | Dec. 15, 1970 |
| [32] | Priority | April 5, 1967 |
| [33] | | Germany |
| [31] | | No. K61,908 |

[54] PHOTOGRAPHIC CAMERA WITH ELECTRONIC SHUTTER SPEED CONTROL AND EXPOSURE TIME INDICATION
5 Claims, 2 Drawing Figs.

[52] U.S. Cl..................................................... 95/10,
250/206, 317/124
[51] Int. Cl..................................................... G03b 7/08,
G01j 1/46

[50] Field of Search........................................... 95/10C, 53;
250/206, 214; 317/124

[56] References Cited
UNITED STATES PATENTS

| 3,063,354 | 11/1962 | Matulik et al................ | 95/10(C) |
| 3,286,610 | 11/1966 | Fahlenberg.................... | 95/10(C) |
| 3,418,479 | 12/1918 | Schmitt........................ | 95/10(C)UX |
| 3,442,190 | 5/1969 | Erickson...................... | 95/10(C) |

*Primary Examiner*—John M. Horan
*Assistant Examiner*—Joseph F. Peters, Jr.
*Attorneys*—Robert W. Hampton and Daniel E. Sragow

ABSTRACT: A photographic camera having an electronic shutter speed control and a meter to preindicate the anticipated exposure time. Both the electronic shutter speed control and the meter are influenced by the same photocell, but they are isolated from each other by a semiconductive switch.

PATENTED DEC 15 1970                               3,547,018

KARLHEINZ HABERLE
*INVENTOR.*

BY Daniel E. Gragow
Robert W Hampton
ATTORNEYS

PHOTOGRAPHIC CAMERA WITH ELECTRONIC SHUTTER SPEED CONTROL AND EXPOSURE TIME INDICATION

CROSS REFERENCE TO RELATED APPLICATIONS

Reference is hereby made to Pat. application Ser. No. 716,073 filed of even date herewith in the name of the same inventor now abandoned.

BACKGROUND OF THE INVENTION

Photographic cameras employing devices of this type are well known in the art. In addition to the switch which controls the electronic shutter speed control, the known devices are provided with an additional mechanical switch which disconnects the photocell from the measuring instrument prior to the initiation of shutter operation, and connects it to the electronic shutter speed control in order to prevent the measuring instrument, due to its low internal resistance, for unduly loading the high-resistance electronic shutter speed control. If this loading were permitted, shutter speeds would be set which do not correspond to the true light conditions.

These known devices have the disadvantage that the above-mentioned switch requires not only additional space in the camera, but it also requires additional assembly and wiring operations. Moreover, the switch must be adjusted with respect to the actuating elements acting upon it, which results in further manufacturing operations and cost.

SUMMARY OF THE INVENTION

It is an object of the invention to avoid these disadvantages.

In accordance with the invention, this object is accomplished in that the electronic shutter speed control is, at least during the shutter operation, uncoupled from the measuring instrument by electronic means, preferably semiconductors. The employment of semiconductors with their inherently small dimensions makes it possible to advantageously include the electronic means directly on the circuit board of the electronic shutter speed control without having to appreciably enlarge the board.

According to one embodiment of the invention, a transistor is used as a preamplifier for the measuring instrument. This causes the input resistance of the instrument to appear high enough so that the current drawn by the measuring instrument is negligible.

In another embodiment, a diode is provided which is back biased by a change of potential caused by the connection of the electronic shutter speed control, thereby blocking the flow of current to the measuring instrument.

BRIEF DESCRIPTION OF THE DRAWINGS

The invention is illustrated by the drawings in which:

Like parts of the invention are designated by the same reference numerals.

Referring to FIG. 1, the base circuit of the transistor 1 includes a light-dependent resistor 2, whereas its collector circuit includes a measuring instrument 3 having a trimming resistor 4 connected in parallel for calibration purposes. Included in the emitter circuit of the transistor 1 is a trimming resistor 5 which serves to shift the operating point. In its rest position, switch 7 is in the position shown in solid lines. The base potential of the transistor 1 is changed in accordance with the brightness of the scene light striking the light-dependent resistor 2, so that the emitter-collector current of transistor 1 causes the indicator of the measuring instrument to deflect to a greater or lesser extent. The exposure time to be expected is indicated schematically on a scale calibrated in time values. To connect the electronic shutter speed control, the switch 6 is closed in a manner known per se by means of a camera release member (not shown). At the same time, the switch 7 is moved away from the position shown in solid lines, where it is held while the shutter is open. Capacitor 8 charges through the light-dependent resistor 2 at a rate which depends on the prevailing light conditions. At the same time, holding magnet 10 is energized, which opens the shutter (not shown). When a predetermined voltage across the capacitor has been reached, the flip-flop 9, which has been connected through switch 6, is triggered and deenergizes the holding magnet 10 which had been energized when exposure was initiated. The deenergization of holding magnet 10 releases the shutter, whereby the exposure is completed.

It should be noted that in view of the plurality of known triggered flip-flops which can be used to effect the shutter release, the above embodiment is merely one of a number of others and, therefore, need not be explained or illustrated in detail.

After the shutter operation, the switch 7 is returned to its initial position, so that the condenser 8 can discharge through the resistor 11, thus preventing any residual charge by which the subsequent exposure would be distorted. The essential feature of the described embodiment is that, due to the high resistance base circuit circuit of the transistor 1, an exposure-distorting flow of current to the measuring instrument during the condenser charge and discharge, respectively, is positively prevented.

To attain an even higher input resistance of the preamplifier, a cascade connection or a field-effect transistor can be advantageously employed.

Figure 1:
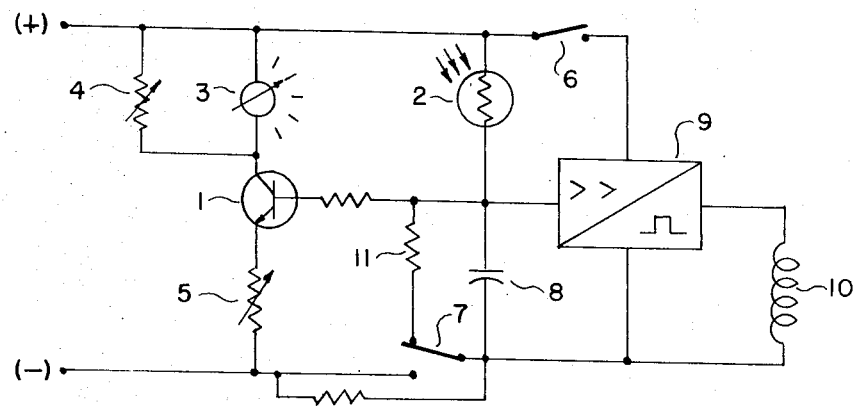
FIG. 1 shows a basic wiring diagram using a preamplifier.
Figure 2:
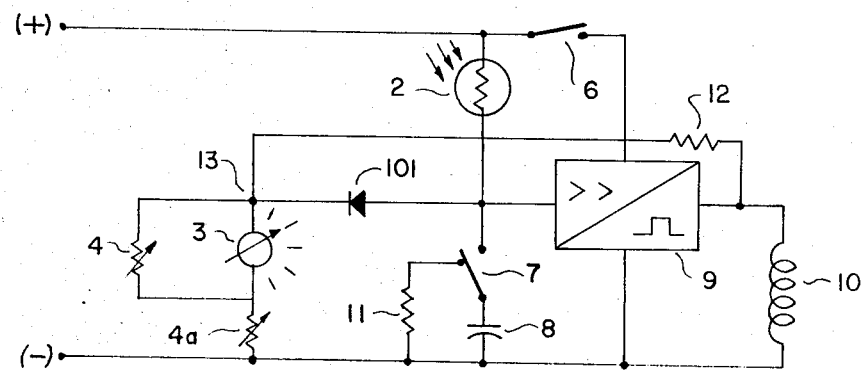
FIG. 2 shows another wiring diagram using a diode.

In the embodiment shown in FIG. 2, when switch 6 is open, measuring current flows from the light-dependent resistor 2 through the diode 101 to the measuring instrument 3 with its trimming resistors 4 and 4a. The exposure time to be expected is indicated in a manner similar to FIG. 1. By closing the switch 6, flip-flop 9 is energized and the holding magnet 10 is excited. Simultaneously, the switch 7, as described above, is moved to its other position thus permitting capacitor 8 to charge. Since holding magnet 10 is energized, current flows also through resistor 12 to the junction 13 of the measuring instrument 3 and the diode 101. As a result thereof, junction 13 becomes positively charged. This reverse biases diode 101 thus making it nonconductive, and thus effectively disconnecting instrument 3. After the flip-flop 9 has been triggered, the holding magnet 10 is deenergized, the shutter is closed, and the switch 7 is returned to the position shown in solid lines. At the same time, the diode 101 is again rendered conductive and the measuring instrument is again ready for indication.

It is, of course, possible to include the electronic circuit elements in a hybrid or integrated circuit rather than on a circuit board. Also, the invention is not restricted to the employment of a holding magnet, as in the embodiments shown. With a simple modification of the circuit, it is also possible to use a shutter which can be released only by the attraction of the armature, without departing by this or other modifications from the scope of the invention.

The invention has been described in detail with particular reference to preferred embodiments thereof, but it will be understood that variations and modifications can be effected within the spirit and scope of the invention.

I claim:

1. In a camera having a shutter with an automatic shutter time control, means for actuating the shutter, an indicating instrument, and a photocell, said photocell being adapted to control both the indicating instrument and said shutter time control, said shutter-actuating means being controlled by said shutter time control, the combination comprising:
    a. a unidirectional current conducting element electrically connected in circuit with said photocell and said instrument; and
    b. means electrically coupling said shutter-actuating means to said unidirectional current conducting element, for back-biasing said unidirectional current conducting element in response to operation of said shutter-actuating means.

2. The invention as in claim 1 in which:

a. said shutter actuating means comprises an electromagnet;
b. said unidirectional current conducting element comprises a diode having a cathode and an anode, and further comprising;
c. positive and negative terminals adapted to be connected to corresponding terminals of a source of direct current potential;
d. means for connecting said positive and negative terminals to said electromagnet; and
e. means for coupling said positive terminal to said cathode when said electromagnet is energized.

3. In a camera having a shutter for initiating and terminating an interval of exposure to a scene, the combination comprising:
a. photoelectric means for producing an electric current in response to scene illumination;
b. means coupled to said photoelectric means for indicating the level of scene illumination;
c. a capacitance;
d. means coupling said capacitance to said photoelectric means for charging said capacitance at a rate determined by the current produced by said photoelectric means; and
e. semiconductive switch means for isolating said indicating means from said capacitance so that the rate of charge of said capacitance is not affected by said indicating means.

4. In a camera, the combination according to claim 3 in which said isolating means comprises a transistor.

5. In a camera, the combination according to claim 3 in which said isolating means comprises a diode.